US011304403B1

(12) United States Patent
Alexander

(10) Patent No.: US 11,304,403 B1
(45) Date of Patent: Apr. 19, 2022

(54) ELEVATOR SUPPORT FOR HOLDING ANIMAL CONSUMABLE SUBSTANCE

(71) Applicant: Buckeye Innovations LLC, Carrollton, OH (US)

(72) Inventor: Ryan M Alexander, Cuyahoga Falls, OH (US)

(73) Assignee: BUCKEYE INNOVATIONS LLC, Carrollton, OH (US)

( * ) Notice: Subject to any disclaimer, the term of this patent is extended or adjusted under 35 U.S.C. 154(b) by 516 days.

(21) Appl. No.: 16/283,968

(22) Filed: Feb. 25, 2019

Related U.S. Application Data

(60) Provisional application No. 62/710,778, filed on Feb. 26, 2018.

(51) Int. Cl.
*A01K 5/015* (2006.01)
*F16M 11/22* (2006.01)

(52) U.S. Cl.
CPC ............. *A01K 5/015* (2013.01); *F16M 11/22* (2013.01)

(58) Field of Classification Search
CPC ...... A63H 17/262; A63H 31/00; A63H 27/02; A01K 5/01; A01K 1/0356; A01K 1/10; A01K 5/0114; A01K 97/10; A01K 61/80; A01K 7/00; A01K 39/014; A01K 5/00; A01K 5/015
See application file for complete search history.

(56) References Cited

U.S. PATENT DOCUMENTS

| | | | | |
|---|---|---|---|---|
| 1,786,777 A * | 12/1930 | Pfeiffer | ............. | A01K 5/015 119/51.03 |
| 2,661,719 A * | 12/1953 | Scheidt | ............. | A01K 5/015 119/51.03 |
| 3,241,524 A * | 3/1966 | Torson | ............. | A01K 5/015 119/51.03 |
| 3,259,106 A * | 7/1966 | Ray | ............. | A01K 5/015 119/51.03 |
| 3,897,724 A * | 8/1975 | McDonald | ............. | B65B 27/083 100/34 |
| 2014/0116344 A1 * | 5/2014 | Holscher | ............. | A01K 39/0106 119/57.8 |

FOREIGN PATENT DOCUMENTS

DE 202016100166 U1 * 1/2017 ............. A01K 5/015

* cited by examiner

*Primary Examiner* — Monica L Barlow
*Assistant Examiner* — Brittany A Lowery
(74) *Attorney, Agent, or Firm* — Ralph E. Jocke; Walker & Jocke

(57) ABSTRACT

An elevator support (10) for holding a block (16) of an animal consumable substance includes a body (22). The body includes a central hub (24) and a plurality of radially outward extending arms (26). A ground face side (32) of the body includes a recess (36) or a projection (112) for engaging the body with a top of a vertically extending post (40, 120). The body is positioned above ground level (12) at a height that is appropriate for the animals that are to consume the substance. The body includes a plurality of spaced apertures (46). A plurality of pins (56) are selectively locatable in the apertures for purposes of holding various sizes and configurations of blocks of animal consumable material in intermediate relation of the pins and in supported relation on the body.

22 Claims, 18 Drawing Sheets

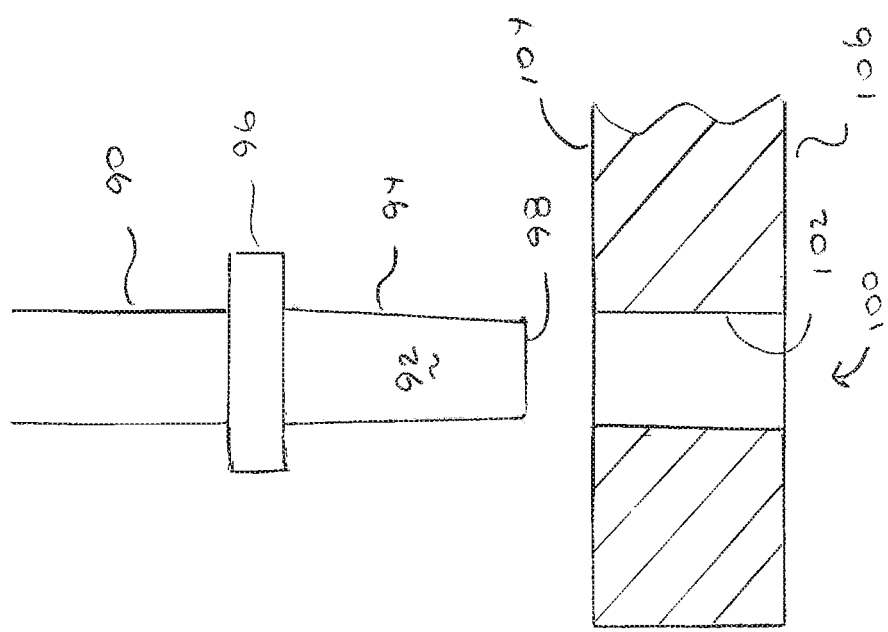

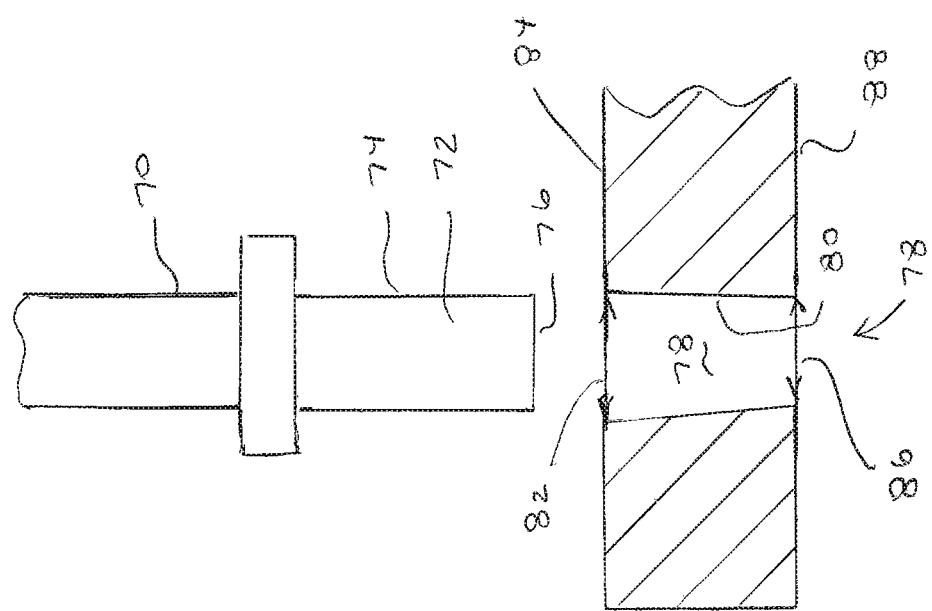

US 11,304,403 B1

ELEVATOR SUPPORT FOR HOLDING ANIMAL CONSUMABLE SUBSTANCE

TECHNICAL FIELD

Exemplary embodiments relate to an elevator support that operates to hold blocks of animal consumable substances such as food, minerals, medicines or other items at a selected height above ground level. Exemplary embodiments further relate to elevator supports that are suitable for holding blocks of differing sizes, and holding blocks that change size as they are consumed by animals.

BACKGROUND

It is sometimes desirable to provide animals with consumable materials that are beneficial to the well-being of the animals. Such consumable materials may include food, minerals, medicines, protein, salt or other items that will benefit the animals.

Placing such items on the ground or in a container that is readily accessible from the ground may result in the material being consumed by vermin or other animals for which the material was not intended. Further, the material may be covered up by snow or debris which makes it harder for the animals to locate the material. In addition the material may become and remain wet so that it dissolves and leaches into the ground or begins to grow mold or other bacteria.

Devices for holding animal consumable substances may benefit from improvements.

SUMMARY

Exemplary embodiments relate to an elevator support for holding animal consumable substances. The exemplary elevator support is configurable to hold a block of an animal consumable substance at a desired level above ground level. By placing the substance at a desired level the material is more likely to be accessible to the animals for which the substance is intended, and less likely to be consumed by other animals for which the substance is not intended.

Exemplary arrangements further provide for holding the substance above ground level so that the substance is less likely to hold water, dissolve or grow mold or other bacteria. Further exemplary arrangements enable securely holding blocks of consumable materials of different initial sizes, as well as holding such blocks of material that decrease in size or break apart as they are consumed by animals.

Further advantages and capabilities of exemplary arrangements will be made apparent from the following detailed description.

BRIEF DESCRIPTION OF DRAWINGS

FIG. 14 is a side cross-sectional view of an exemplary aperture in an arm of an exemplary body and an exemplary pin with a tapered stub.

FIG. 15 is a side cross-sectional view of an exemplary tapered aperture in an arm of an exemplary body and exemplary pin with a straight cylindrical stub.

FIG. 19 is a side view of an alternative embodiment that includes a top piece that is releasably engageable with the pins and overlies the sky face side of the body.

DETAILED DESCRIPTION

It will be understood that features of exemplary embodiments may be arranged in a wide variety of different configurations. Thus the following detailed description of an exemplary apparatus and method is not intended to limit the scope of the claims appended hereto, but are merely representative of selected exemplary embodiments that implement the principles that are described herein.

The features structures and/or characteristics described herein may be combined in any suitable manner in one or more embodiments or arrangements. That is, a particular feature, structure or characteristic described in connection with one embodiment may be included in other embodiments or arrangements.

Figure 1:
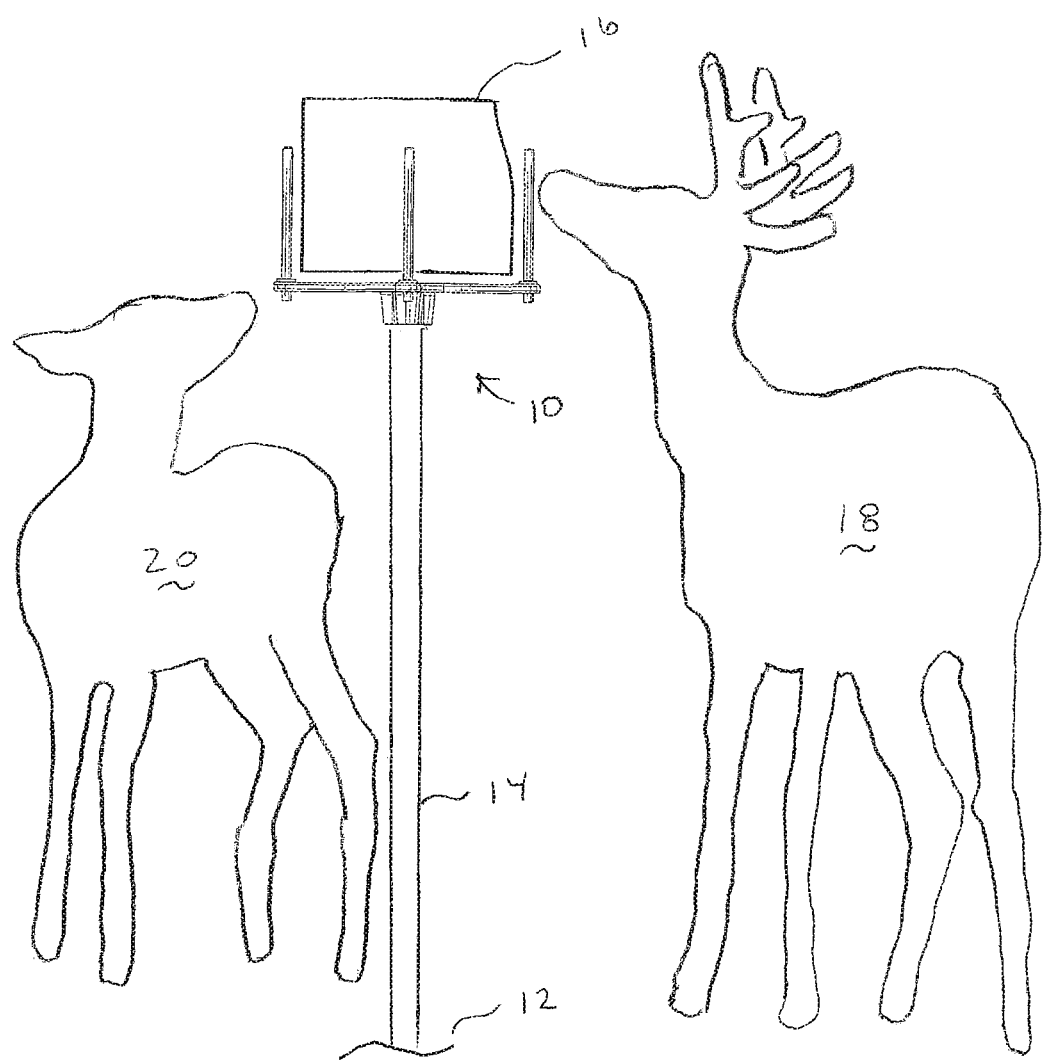
FIG. 1 is a side view of an exemplary elevator support for holding animal consumable substances, and showing exemplary animals that are enabled to access the substance that is being held by the support.
Figure 2:
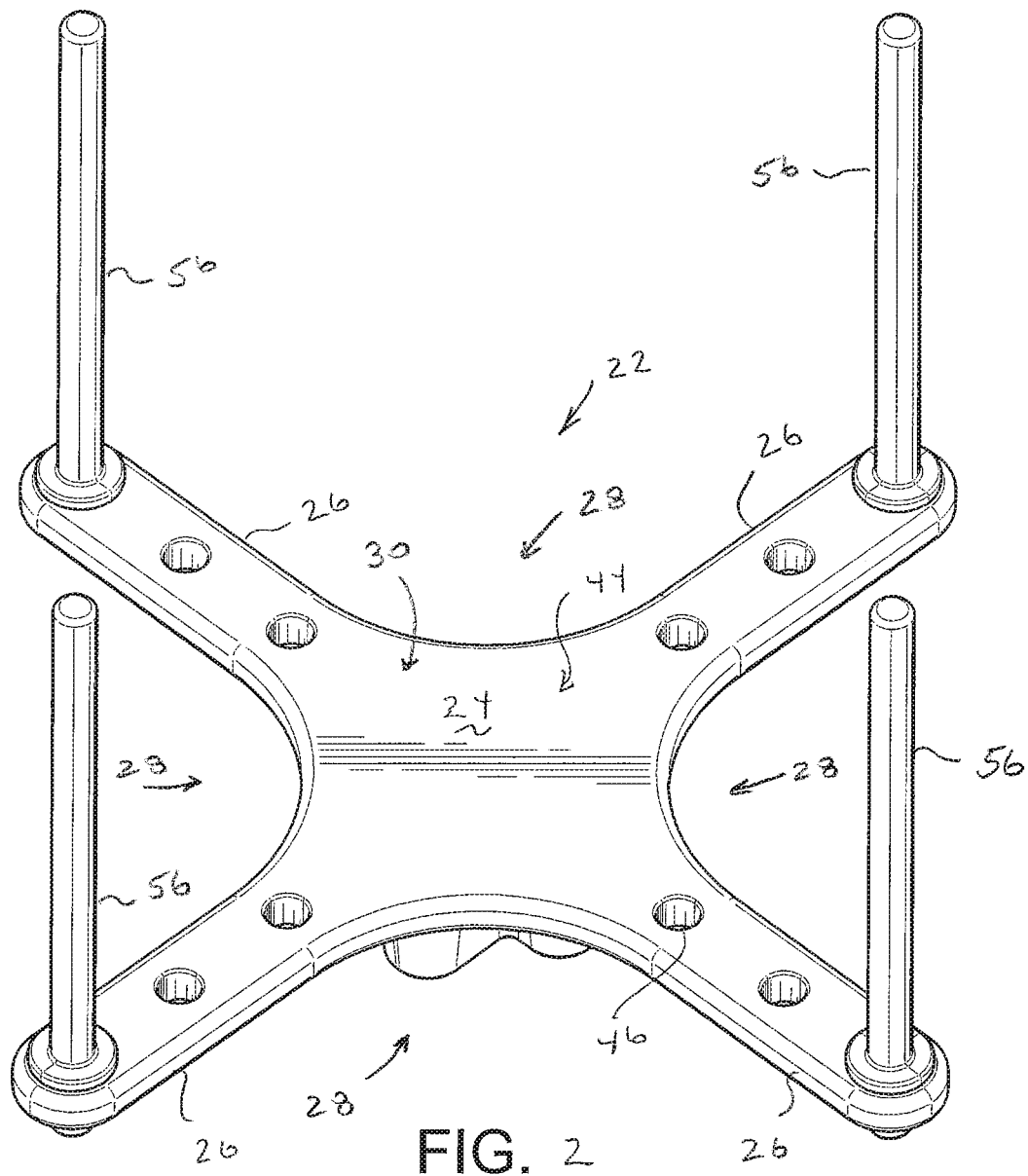
FIG. 2 is a front top perspective view of an exemplary body of the support with four removable pins installed in engagement with the body.

Referring now to the drawings and particularly to FIG. 1 there is shown therein an exemplary embodiment of an elevator support for an animal consumable substance generally indicated 10. The exemplary support is positioned at a selected height above ground level 12 at the top of a vertically extending post 14. The exemplary support is operative to support a block 16 of an animal consumable substance. In the exemplary arrangement the block comprises a solid or semi solid body that includes one or more of food, minerals, medicine, protein, salt or other material that is intended to be consumed by animals 18, 20 of a particular type. In the exemplary arrangement the support can be set at a selected height above ground level so the block may be accessed by animals of the intended type, while being rendered generally inaccessible to other animals for which the consumable substance is not intended.

One exemplary embodiment of the elevator support is shown in FIGS. 2 through 15. The exemplary embodiment includes a body 22. The exemplary body 22 includes a central portion or hub 24 and a plurality of arms 26. In the exemplary embodiment each of the arms extend radially outward from the central hub 24. In the exemplary arrangement shown there are four angularly spaced arms. Each of the arms is angularly spaced from the two immediately adjacent arms at a 900 angle. Access openings 28 extend between each immediately adjacent pair of arms 26. Of course it should be understood that this configuration is exemplary and in other embodiments, other body arrangements, numbers of arms, angular spacing and configurations may be used.

Figure 3:
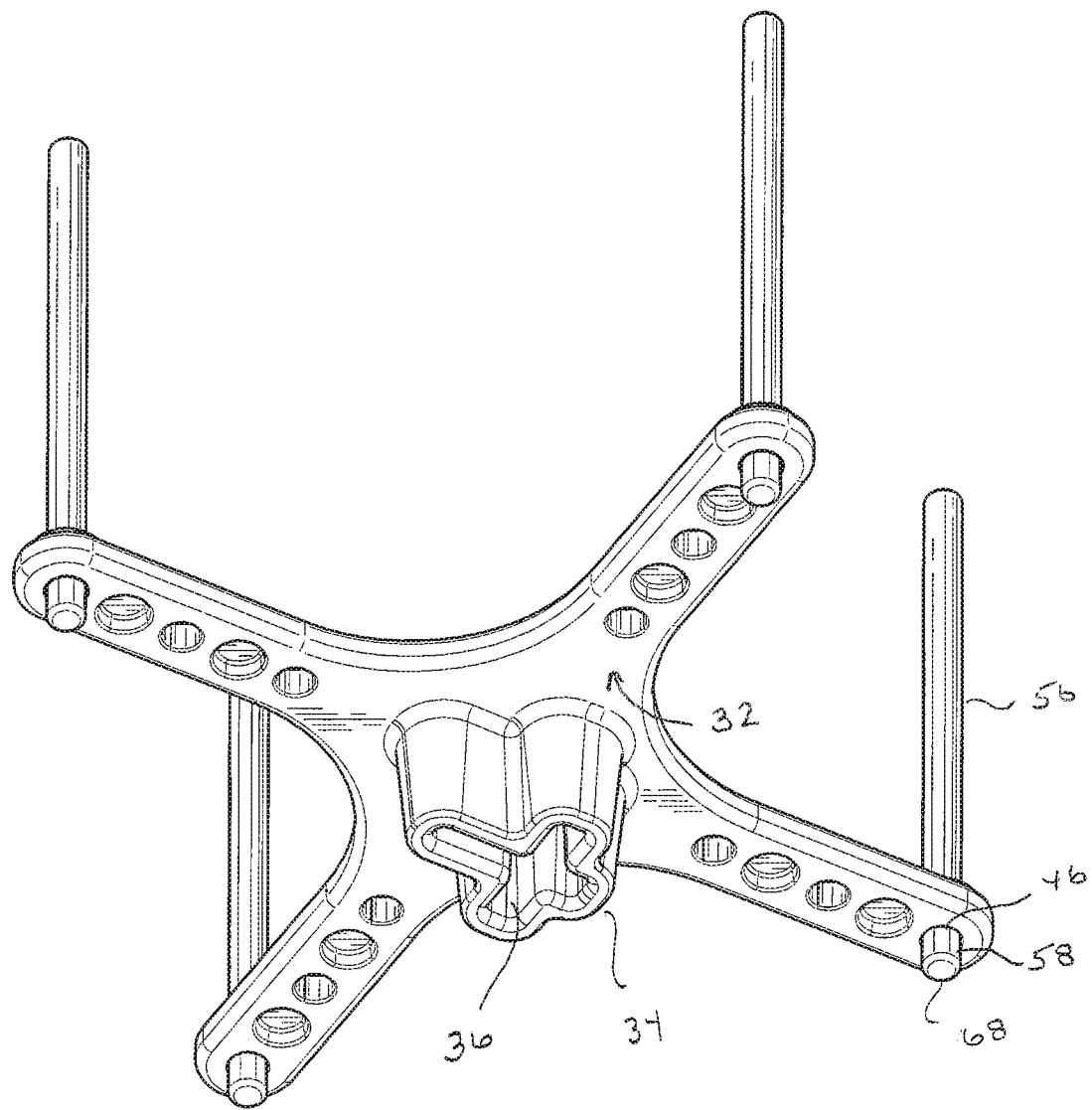
FIG. 3 is a bottom right perspective view of the body and the pins shown in FIG. 2.
Figure 4:
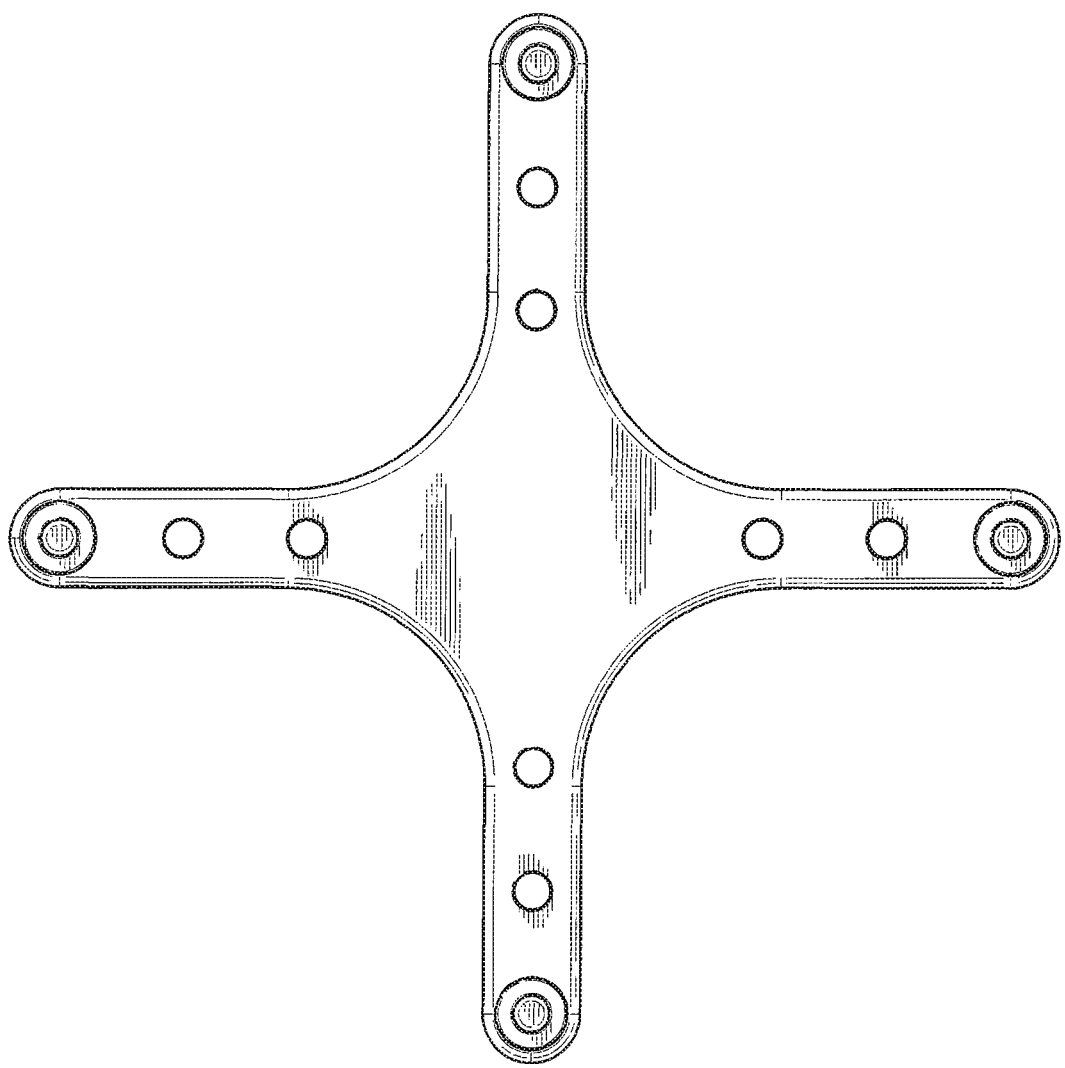
FIG. 4 is a top plan view of the body and pins shown in FIG. 2.

The exemplary body 22 includes a lateral sky face side 30 and an opposed lateral ground face side 32. In the operative position of the body the sky face side faces skyward while the ground face side faces toward the ground. As shown in FIG. 3 the ground face side 32 of the embodiment shown therein, includes a collar 34. In the exemplary arrangement the collar 34 extends outward on the ground face side and includes a substantially T-shaped recess 36 therein. For purposes of this disclosure substantially T-shaped means that the cross-sectional configuration of the recess includes the shape of the letter "T" although additional legs or projections may be included on the recess.

Figure 8:
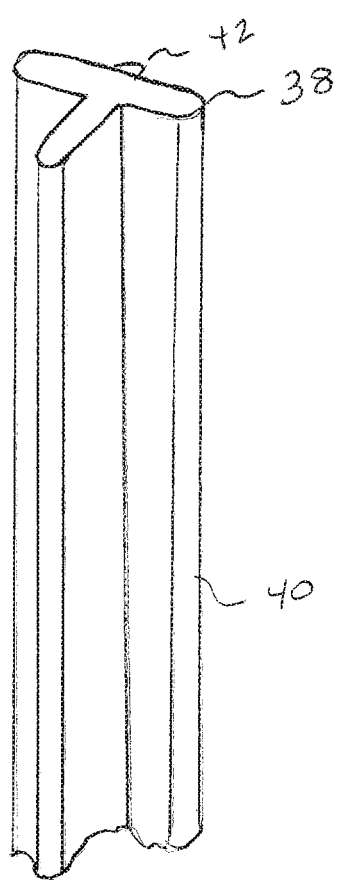
FIG. 8 is a front top right perspective view of a top of a vertically extending post that is usable to support an exemplary body.
Figure 9:
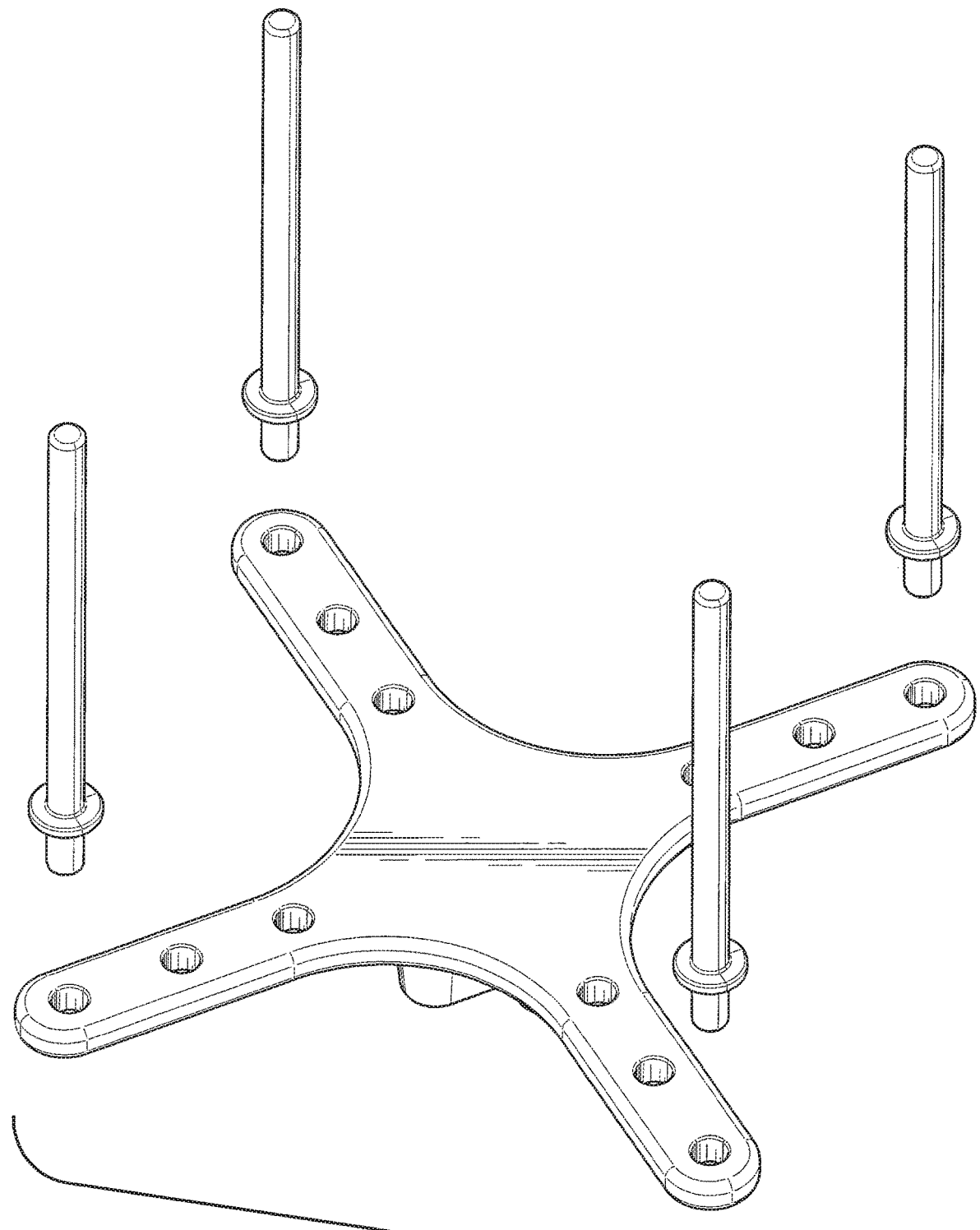
FIG. 9 is an exploded perspective view of the body and pins shown in FIG. 2.

In the exemplary arrangement shown in FIG. 3 the T-shaped recess is configured to receive therein a top 38 of a post 40 that has a T-shaped cross-section like that shown in FIG. 8. In the exemplary arrangement the T-shaped post 40 includes a plurality of longitudinally spaced projections 42, the top one of which projections is shown in FIG. 8. Such projections can be used to help secure items in engagement with the side of the T-shaped post from which the projections extend. In the exemplary arrangement the collar is comprised of a rigid yet resilient locally deformable material, and the recess 36 is configured to provide a tapered interference fit with the top of the post. As a result when the top of the post is pressed into engagement in the recess, the post is held in engagement with the recess through engagement with such resilient deformed material. Of course it should be understood that this configuration is exemplary and in other embodiments other approaches may be used.

In the exemplary embodiment the sky face side 30 of the body includes a substantially planar face 44. The planar face extends across the sky face side of all four arms 26 and the hub 24. For purposes hereof substantially planar shall be considered to mean that a majority of the surface on the sky face side of the arms and hub generally lie within a single plane. Of course it should be understood that this configuration is exemplary and in other embodiments other surface contours configured for holding blocks of animal consumable material may be used. For example in some arrangements surfaces with significant variations in elevational contours and/or surface texture may be desirable for purposes of holding and maintaining the integrity of blocks of certain types of materials.

Figure 10:
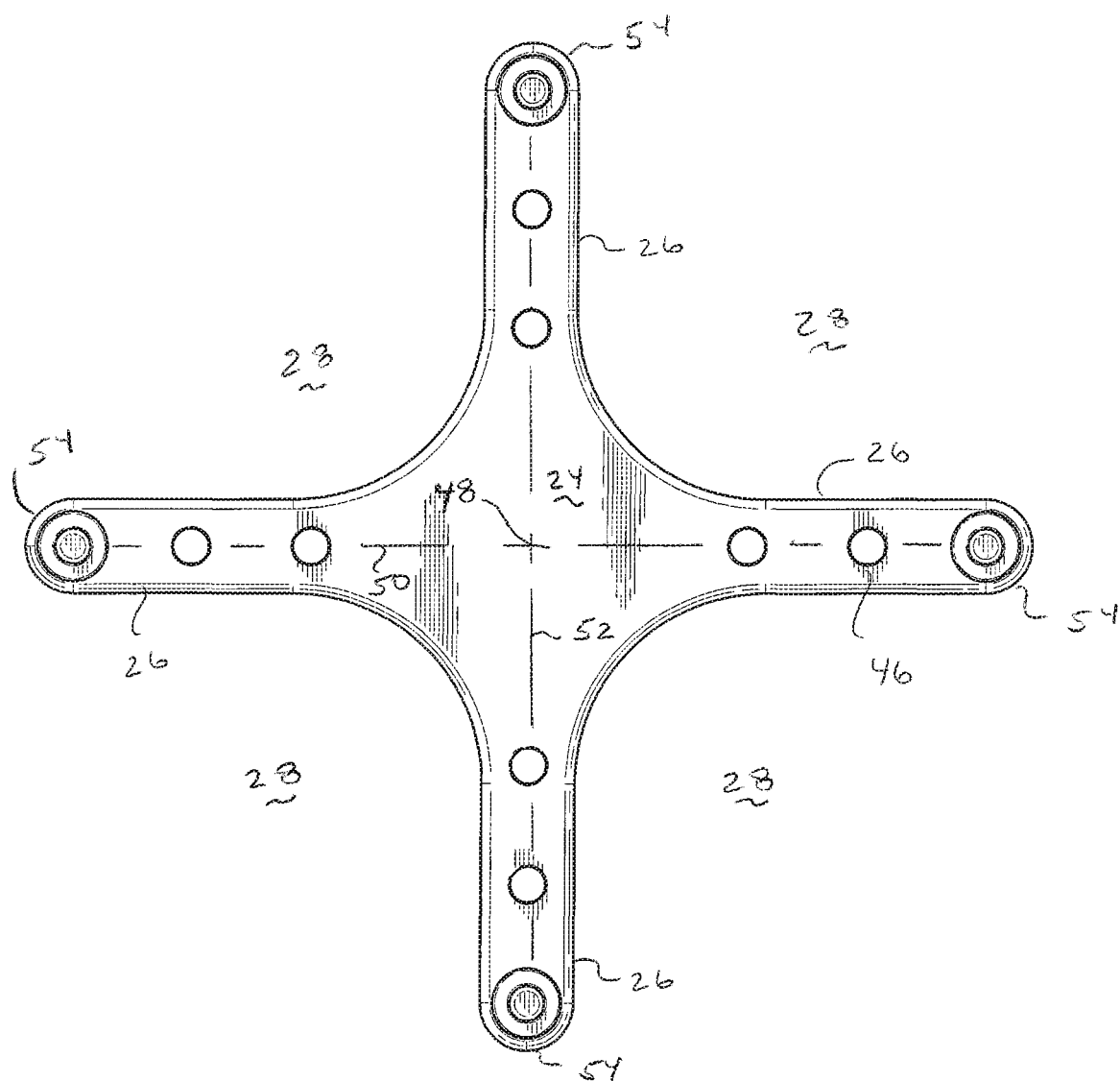
FIG. 10 is a top plan view of the body and pins indicating the axial alignment of the apertures that extend through the arms of the exemplary body.

In the exemplary embodiment each of the arms include a plurality of apertures 46. In the exemplary arrangement each of the apertures have the same configuration and the same size for reasons that are later explained. In the exemplary arrangement and as represented in FIG. 10 the arms are arranged in opposed pairs that extend in linearly aligned relation with one another relative to the center 48 of the hub 24. In the exemplary arrangement the plurality of apertures 46 are radially disposed from other apertures in the same arm and are aligned along radially extending lines 50, 52 such that the apertures in opposed arms are linearly aligned. Of course it should be understood that this arrangement is exemplary and in other embodiments other approaches may be used.

In the exemplary arrangement each of the arms 26 includes 3 apertures therein. Each of the apertures in each of the arms is spaced at 3 different radially outward distances from the center 48 of the hub 24. Of course it should be understood that this number and arrangement of apertures is exemplary and in other embodiments other numbers and arrangements of apertures may be used. In the exemplary arrangement each of the arms terminate radially outwardly in a smoothly contoured end tip 54. Various end tip contours may be used. In the exemplary arrangement each of the apertures extend through the body from the sky face side 32 to the ground face side 32. The apertures of the exemplary arrangements may have different contours as is later discussed herein.

In the exemplary arrangement the body is comprised of a unitary structure. The exemplary body comprised of a substantially rigid but somewhat resilient and locally deformable material. For example in some arrangements the body may be comprised of a fiber reinforced thermoplastic material. Other embodiments may be comprised of different types of plastics of metals. The body and associated components can be comprised of materials having different coloration. However, numerous different types of materials and types of body constructions and colorations may be used in various embodiments.

Figure 6:
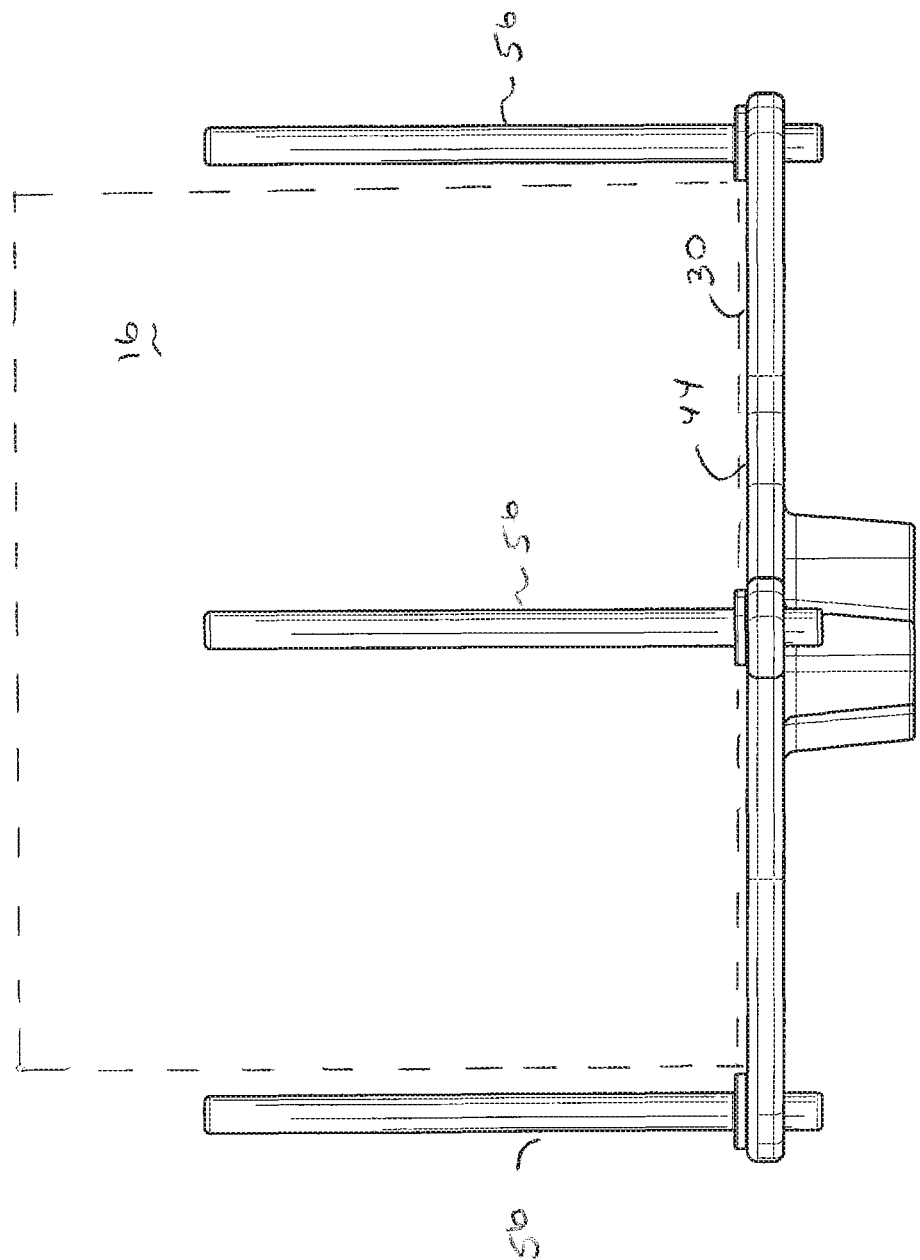
FIG. 6 is a view similar to FIG. 5 with a block of an animal consumable substance supported on the body and in intermediate relation of the pins.
Figure 7:
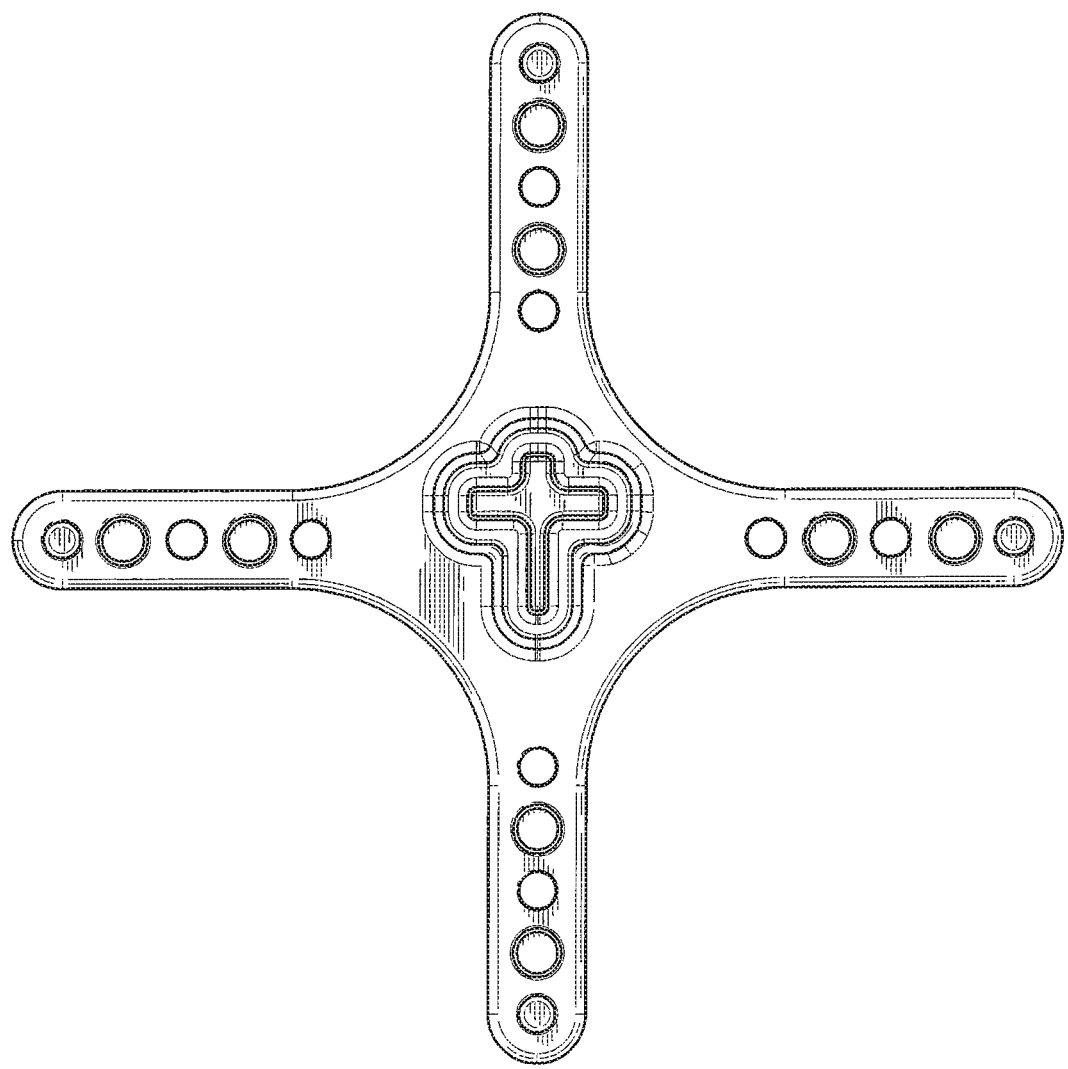
FIG. 7 is a bottom view of the body and pins shown in FIG. 2.

In the exemplary arrangement the elevator support includes at least four pins 56. In the exemplary arrangement each pin 56 is configured so that it may be releasably engaged in any of the apertures 46 in any of the arms 26. Each of the pins extend outward and transverse to the planar face 44 on the sky face side 30 of the body. In the exemplary arrangement the locations of the pins are selectively changeable by the user by engaging the pins in the different apertures on the arms. This is done so that the plurality of pins may be positioned to hold the block 16 in intermediate relation of the pins and in supported connection with the planar face 44 of the sky face side 30 of the arms and the hub as represented in FIG. 6. However it should be understood that other embodiments may use different sizes, types and arrangements of pins.

As can be appreciated the ability to selectively locate and change the location of the pins enables holding blocks of different sizes in engaged and/or in intermediate relation of the pins. This capability of the exemplary embodiment further enables the pins to be relocated so that the pins may continue to hold the block in intermediate relation of the pins as the block is reduced in size due to consumption by the animals or other factors. Numerous different arrangements of the pins may be implemented by relocating the pins in the apertures for purposes of holding blocks having different sizes and shapes. Further in exemplary arrangements more than four pins or other holding structures may be utilized so that multiple different blocks of the same or different substances may be held intermediate of the pins on different areas of the support. Of course it should be understood that these approaches are exemplary and in other embodiments other approaches may be used.

Figure 11:
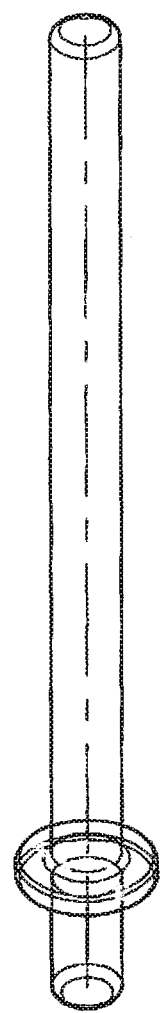
FIG. 11 is a perspective view of an exemplary pin.
Figure 13:
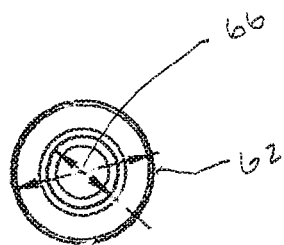
FIG. 13 is a top view of an exemplary pin.
Figure 12:
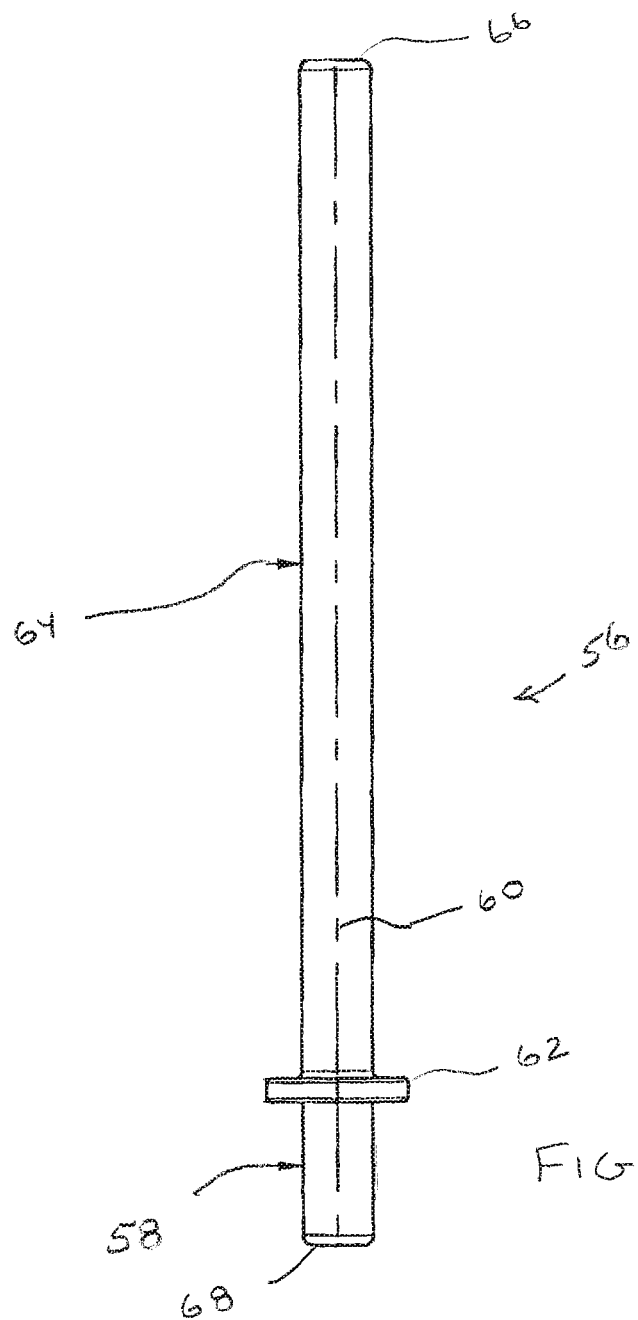
FIG. 12 is a side view of an exemplary pin.

As shown in FIGS. 11 through 13 the exemplary pins 56 include a stub 58. The stub 58 of the exemplary arrangement extends along an axis 60 of the pin. An enlarged area which is alternatively referred to as a cylindrical boss 62, extends radially outwardly on the pin 56. The size of the exemplary boss is larger than the diameter of each aperture 46 so as to prevent the boss from passing therethrough. Of course numerous different configurations of enlarged areas on the pins may be used to perform the functions of the exemplary boss.

A mast 64 extends axially on opposed axial side of the boss 62 from the stub 58. In the exemplary embodiment the mast 64 has a longer axial length than the stub 58. The mast 64 terminates at an outward end 66. The stub 58 terminates at an opposed inward end 68. In exemplary arrangements the pins are of molded unitary construction. However this construction is exemplary and other embodiments other approaches may be used.

Figure 5:
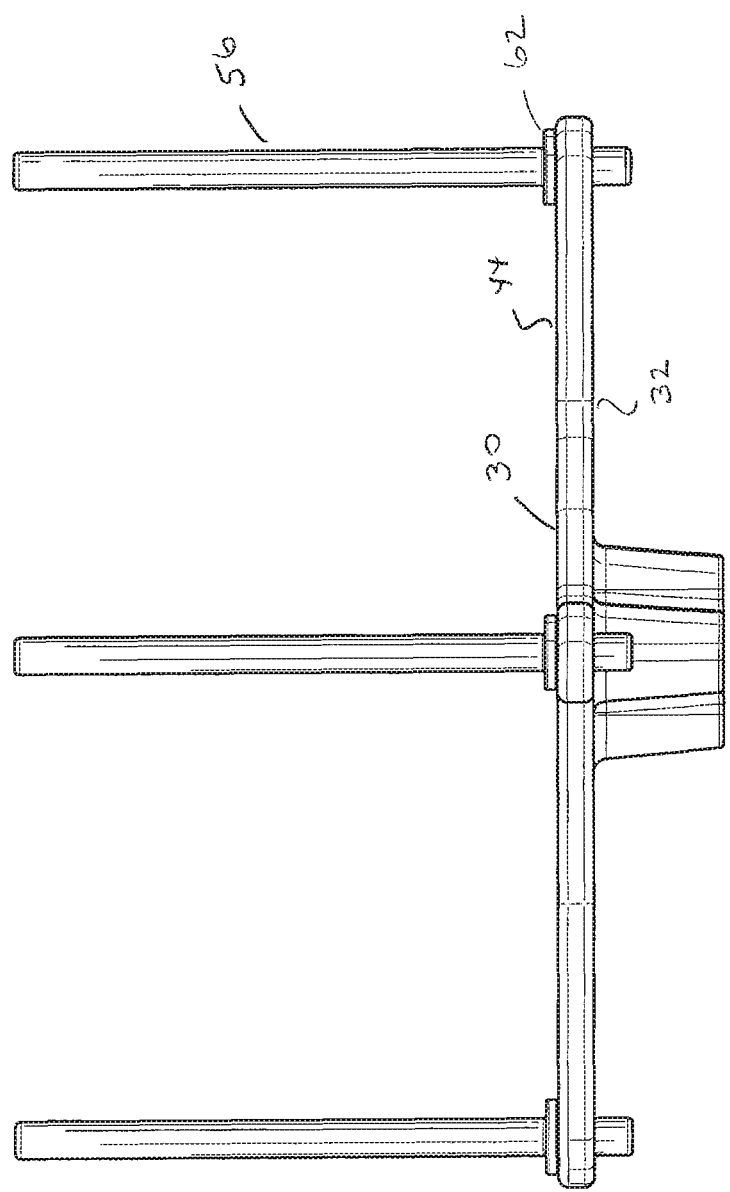
FIG. 5 is a front view of the body and pins shown in FIG. 2.

As shown in FIGS. 3 and 5, the inward end 68 of the stub 58 is extended in a respective aperture 46 to position the pin 56 therein. The movement of the pin 56 into the aperture is limited by the engagement of the boss 62 or other structural engagement feature on the pin, with the planar face 44 of the sky face side 30 of the body. The engagement of the boss or other engagement with the sky face side of the arm helps to assure that the pin is properly fully extended within the arm so as to provide firm engagement with the arm and to provide support for holding the block in engaged relations therewith. In the exemplary arrangement the inward end 68 of stub 58 is configured to extend through both the sky face side and the ground face side 32, and the stub to protrude outwardly from the ground face side. This configuration is utilized in the exemplary embodiment so as to assure that each pin is firmly engaged with the body in the respective aperture 46. The mast 64 of the respective pin 56 is configured to extend sufficiently above the sky face side of the body so as to maintain the block of the substance held on the elevator support in engaged and/or intermediate relation of the pins 56. Of course it should be understood that these structures and this approach is exemplary and in other embodiments other configurations, structures and approaches may be used.

In exemplary arrangements the apertures 46 and the pins 56 may have different configurations. Such different configurations may be utilized for purposes of assuring that the pins and the body remain in fixed engagement once a pin has been installed in a respective aperture. For example FIG. 15 shows an exemplary pin 70 that includes a stub 72 that has a straight outer cylindrical stub wall 74. The stub wall terminates an inward end 76. In this exemplary arrangement the stub engaging aperture 78 within the body is configured to have an annular tapered aperture wall 80. The aperture 78 of this embodiment is configured to have a larger diameter 82 on a sky face side 84 and a smaller diameter 86 on a ground face side 88 of the body.

In this exemplary arrangement represented in FIG. 15, the body through which the apertures extend and/or the stub may be comprised of substantially rigid yet somewhat resilient locally deformable material such as a thermoplastic or other suitable material. The resilient deformable material is sufficiently rigid to maintain its original form and shape, but is locally deformed in response to the force of the stub 72 being pushed into the aperture 78. The resilient deformable interference engagement fit that results from the extension of the stub into the tapered aperture provides holding force that helps to maintain the pin 70 in engagement with the aperture. Of course it should be understood that this approach is exemplary.

FIG. 14 shows an alternative arrangement in which a pin 90 includes a stub 92 with a cylindrically tapered outer wall 94. The cylindrically tapered outer wall 94 increases in diameter with the axial proximity of the wall to a boss 96 and away from a stub end 98. In this exemplary arrangement the body includes an aperture 100 that is bounded by a straight annular cylindrical wall 102 that has a constant diameter between the sky face side 104 and the ground face side 106 of the body.

In this exemplary arrangement at least one of the stub 94 and the body is comprised of a substantially rigid yet resilient, locally deformable material. The insertion of the stub 94 into the aperture 100 is operative to cause the material to locally deform and provide an interference fit such that the stub 94 is in resilient deformable engagement with the body in the aperture. The pressure force of such resilient deformable engagement is operative to hold the stub and the pin 90 in engagement in the aperture. In exemplary arrangements while the interference fit is sufficiently tight to hold the pins in engagement with the body, the pins are releasable to enable the pins to be relocated.

Figure 18:
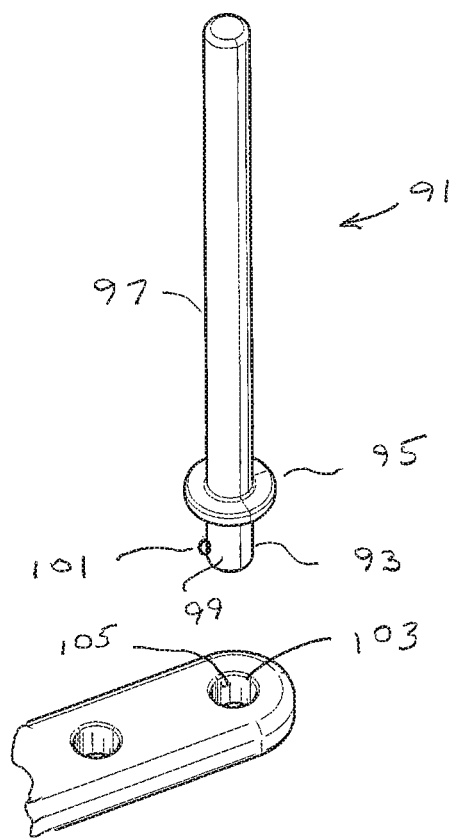
FIG. 18 is a perspective view of an alternative embodiment of a pin.
Figure 61:
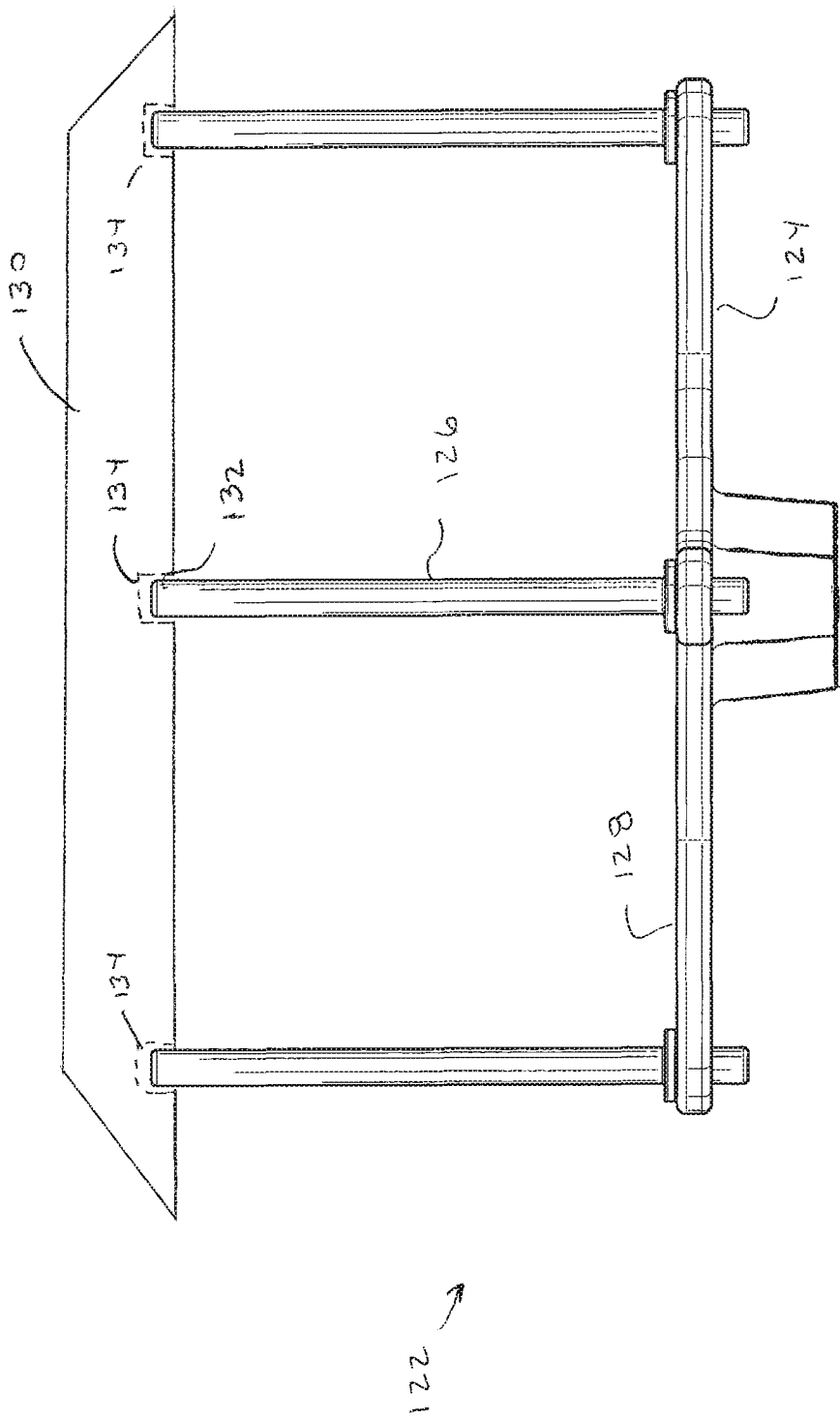

FIG. 18 shows another exemplary alternative embodiment of a pin 91. The pin 91 includes a stub 93. Stub 93 extends axially from a cylindrical boss 95. A mast 97 extends axially on an opposed side of the boss 95 from the stub 93. In the exemplary arrangement the stub 93 has a generally straight cylindrical outer wall 99. The exemplary outer wall includes at least one radially outward extending hemispherical bump or projection 101 thereon. It should be understood that although only one projection 101 is shown on the exemplary pin 91, in other embodiments a plurality of projections may be included on the stub 93.

In this exemplary arrangement the stub 93 is configured to extend in an aperture 103 on the body. In this exemplary arrangement the aperture 103 is bounded by a generally straight cylindrical aperture wall 105 that extends from the sky face side to the ground face side of the body. When the stub 93 is engaged in the aperture 103, the one or more projections 101 engages the wall 105 bounding the aperture through an interference fit. Local deformation of the projection 101 and the wall 105 bounding the aperture 103 is operative to provide a resilient biasing force that operates to hold the stub in engaged relation in the aperture. Of course it should be understood that in other arrangements the size, configurations, number and locations of the radially outward extending projections may be varied to suit the particular configuration and materials of the pin and the body.

Of course it should be understood that these approaches are exemplary and in other embodiments other configurations for holding the pins or similar structures in engagement with the body may be utilized. Such approaches may include for example a threaded engagement or bayonet type engagement between the pins in the body. Further in other exemplary arrangements a fastening arrangement such as a locking fastener may be utilized to engage the stub on the ground face side of the body to prevent the removal thereof from the aperture.

In still other exemplary arrangements other types of pins and fasting configurations may be utilized. For example in some exemplary arrangements the sky face side may include a plurality of spaced projections that extend transverse to the generally planar surface. Such spaced projections may be engaged in recesses of pin structures so as to hold the pins in engagement with the projections. Such an arrangement may be utilized in some embodiments where the plurality of spaced apart projections on the sky face side may be helpful for purposes of engaging and holding the block of the consumable substance in engagement with the sky face side of the support.

In still other exemplary arrangements other types of pins may be utilized for purposes of holding a block of the animal consumable substance in engaged and/or intermediate relation of the pins and on the sky face side of the elevator support. Such configurations may include for example, rotatable pins that are engaged with the body and that can be selectively elevated in selected locations for purposes of holding the desired sized block. The pins that are not utilized or holding or retaining the block may remain in a retracted position and may supply horizontal support underneath the block. In some exemplary arrangements such pins may be spring biased by appropriate springs to maintain engagement with an outer surface of the block. In such exemplary arrangements such spring biasing action may be utilized to further help hold the block in intermediate relation of the pins. It should be understood that various arrangements may be utilized in different embodiments for purposes of locating transversely outward extending pins that are selectively changeable to hold the block in intermediate relation of the pins and in supported relation with the sky face side of the support.

Figure 16:
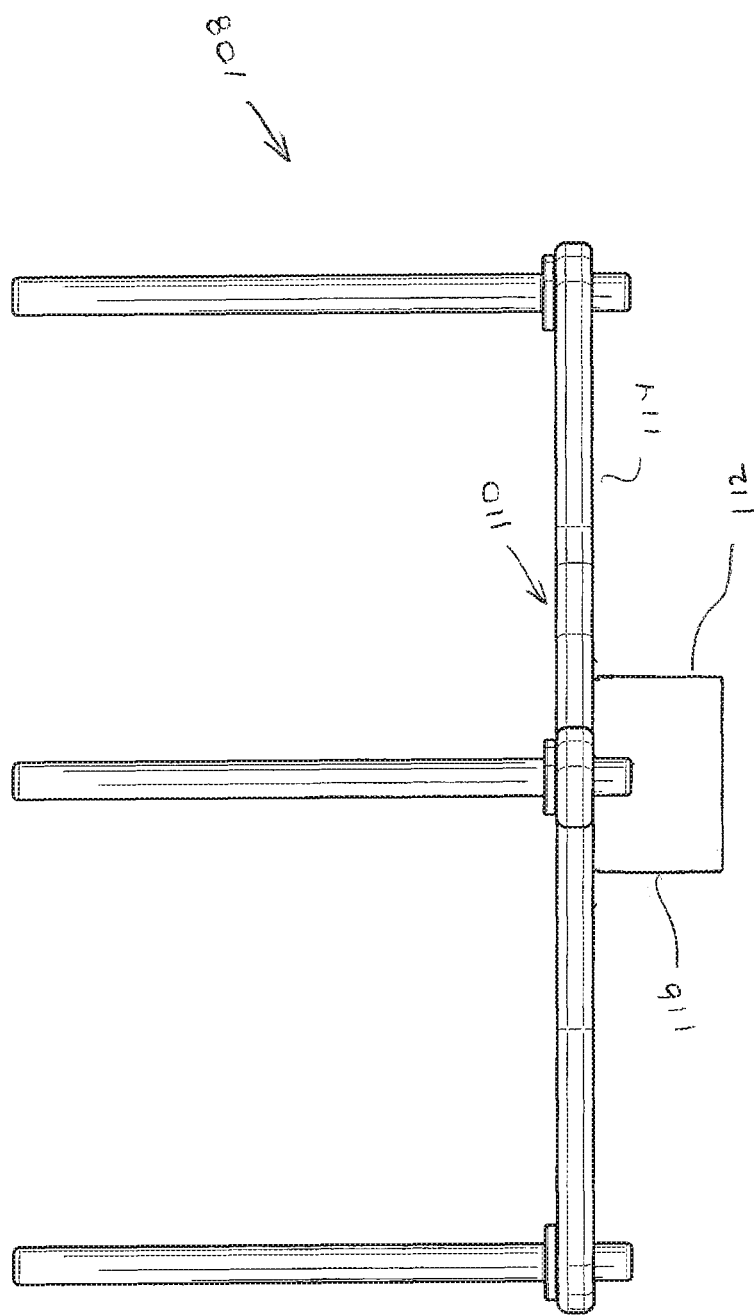
FIG. 16 is a side view of an alternative embodiment of the body that includes a central projection for engaging the top of a vertically extending cylindrical post.
Figure 17:
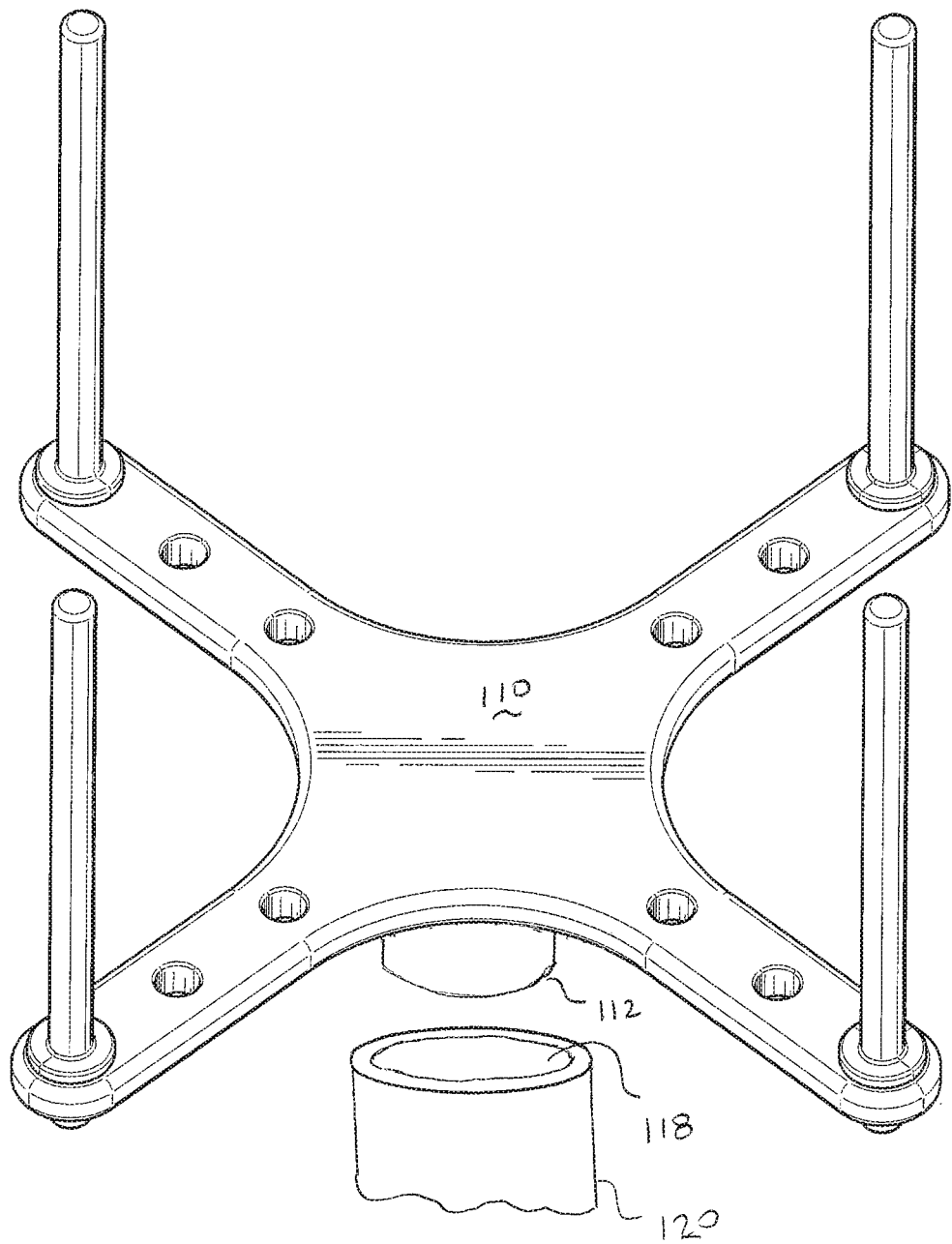
FIG. 17 is a front top perspective view of the body shown in FIG. 16 including a top of a vertically extending post that is configured to receive the projection that extends from the ground face of the body.

FIGS. 16 and 17 show an alternative embodiment of an elevator support for holding a block of an animal consumable substance 108. This alternative embodiment is generally similar to the previously described embodiment except as otherwise specifically indicated.

In this exemplary arrangement the body 110 of the support includes a projection 112 that extends outward on a ground face side 114 of the body. In this exemplary arrangement the projection 112 has an outer annular surface 116. The outer surface 116 in some embodiments may be cylindrical. Alternatively in other embodiments the outer surface 118 may include certain contours, recesses or projections as may be suitable for purposes of engaging the projection 112 in an opening 118 of a vertically extending post 120. As can be appreciated the opening 118 may be configured to correspond to contours of the projection 112 for purposes of preventing rotation and/or disengagement of the body from the post. Alternatively or in addition, fasteners may be positioned to extend through the post to engage the projection 112 for purposes of holding the vertically extending post and the body in fixed engagement. Of course it should be understood that these approaches are exemplary and in other embodiments other approaches may be used.

FIG. 19 shows an alternative arrangement of an elevator support generally indicated 122. This elevator support is the same as the previous embodiments except as otherwise noted. Elevator support 122 includes a body 124 and a plurality of transversely extending pins 126 that extend outward from a sky face side 128 of the body 124. In the exemplary arrangement the pins 126 may be releasably engageable in apertures that extend through the body in a manner like that previously discussed.

In this alternative exemplary arrangement a top piece 130 is releasably engageable with the upper ends 132 of the masts of each of the pins 126. In the exemplary arrangement the top piece 130 includes recesses 134 that are configured to receive the upper ends 132 of all or some of the pins. The top piece overlies at least some of the sky face side of the body. In this exemplary arrangement the top piece 130 may be installed to provide cover for a block of material that is more likely to be adversely impacted by direct exposure to rain or sunlight. The installation of the top piece 130 after the block has been placed in intermediate relation of the pins provides cover that may reduce the adverse effects of rain or sunlight. Of course it should be understood that numerous different types of top pieces may be utilized in connection with different elevator support arrangements.

In the exemplary arrangements described the user may configure the elevator support for supporting a block of animal consumable material by initially selecting a location that is appropriate for the animals that are to consume the material. This may be an appropriate habitat for the particular animals who are to consume the material. Once a suitable location for the support has been selected, user may then drive or otherwise place the vertically extending post into the ground. The vertically extending post may be sized and/or driven into the ground a sufficient distance such that the top of the vertically extending post is above ground level a distance that corresponds to the height of the mouths of the animals that are to consume the material. Alternatively a post for mounting the body may be attached to a tree or other suitable support structure. As can be appreciated the position of the post above ground level may vary based on the particular animal type and/or the age of the animals that are intended to consume the material.

Once the vertically extending post is been positioned at the appropriate height, the body of the elevator support is engaged with the post. This may be done by engaging the top of a post such as post 40 having a T-shaped cross-section in the substantially T-shaped recess 36 of body 22. Alternatively the projection 112 of body 110 may be engaged in the opening 118 of the post 120. In each case in the exemplary arrangements the post and the body may be engaged so that the body is in firm fixed engagement with the post so as to not be readily disengaged through contact with the animals who may rub up against the post and/or the body in an effort to dislodge the block.

The user may then locate the plurality of pins such as pins 56 in the respective apertures 46 in accordance with the size and shape of the particular block that is to be supported. Generally in exemplary arrangements the user will position the pins such that the block is generally centered relative to the hub 24 or other central portion of the body. In some exemplary methods of configuring the device, the user may position the block in centered relation on the substantially planar surface of the sky face side of the body, and then selectively position the pins in the apertures so as to have the block in intermediate relation of the plurality of pins. Further as previously discussed, in situations where multiple blocks of either the same or different material, or blocks having configurations other than rectangular are to be supported, a plurality of pins in numbers greater than the four pins that have been described in the exemplary arrangement may be used for purposes of holding the one or more blocks in intermediate relation. Of course it should be understood that the particular arrangement and the location and number of the pins engaged in the apertures will depend on the particular block size and shape and the arrangement that is desired by the user.

Once the one or more blocks are in supported engagement with the elevator support, the animals may access the block to consume the substance. The access openings 28 between the arms 26 of the exemplary embodiment enable animals to access the block through the access openings from multiple sides of the support. Further in the exemplary arrangement the access openings enable animals to access the block from underneath through the access openings. This facilitates the ability of the animals to consume the substance.

As previously discussed the elevated support structure avoids conditions where the consumable material becomes saturated by sitting in a puddle of water or otherwise is caused to substantially dissolve. Further the elevation of the substance above ground level avoids the risk that the block will be obscured from view or become inaccessible to the animals as a result of leaves, debris or snow cover. In addition the elevation of the consumable material above ground facilitates the drying of the material in the event that it does become wet and reduces the risk that the material will begin to rot, grow mold or have other contamination.

In some exemplary arrangements as the block of material is consumed by the animals, the size of the block is reduced and/or the shape changes. As the size of the block is reduced and the shape changes the user can relocate the pins into different apertures to maintain the block of reduced size or of different shape in intermediate relation of the pins and centrally supported on the sky face side of the body. Further in some exemplary arrangements in the event that the block is broken into multiple pieces, a plurality of pins may be utilized to hold the separated blocks together in a single mass, or the separate blocks may be held separately between sets of selectively located pins. Various approaches may be utilized depending on the nature of the consumable material and the configuration of the material to be supported.

Thus it can be appreciated that the exemplary arrangements of elevator support described herein enable providing numerous different types of consumable substances to animals in ways that help to facilitate the consumption of the material by the animals. Of course it should be understood that the structures shown are exemplary, and may be modified for purposes of providing consumable materials in different circumstances and under different conditions while still utilizing the principles and useful structures and arrangements that have been described herein in connection with the exemplary embodiments.

Thus the exemplary embodiments achieve improved operation, eliminate difficulties encountered in the use of prior devices and methods, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful concepts are not limited to the exact features shown and described.

It should be understood that the features and/or relationships associated with one embodiment can be combined with features and/or relationships from another embodiment. That is, various features and/or relationships from various embodiments can be combined in further embodiments. The useful scope of the disclosure is not limited to only the exact embodiments that have been shown and described herein.

Having described features, discoveries and principles of the exemplary embodiments, the manner in which they are constructed and operated, and the advantages and useful results attained: the new and useful features, devices, elements, arrangements, parts, combinations, systems, equipment, operations, methods, processes and relationships are set forth in the appended claims.

I claim:

1. Apparatus comprising:
an elevator support configured to hold a block of an animal consumable substance above ground level for consumption by animals, including
a body,
wherein the body includes
a central hub, and
four arms,
wherein each arm extends radially outward away from the central hub,
wherein each arm is angularly spaced from each immediately adjacent arm,
wherein an access opening extends between each pair of immediately adjacent arms,
wherein in an operative position each arm extends radially away from the central hub and parallel to ground and the body and each arm includes a ground facing first lateral side and an opposed sky facing second lateral side,
wherein the central hub on the first lateral side includes a recess, wherein the recess is configured to receive a top of a vertically extending post,
wherein on the second lateral side each arm includes a plurality of apertures,
wherein each aperture on a respective arm is radially disposed from at least two other apertures on the respective arm,
at least four pins, wherein each of the at least four pins is releasably engageable in any of the plurality of apertures on any of the arms,
wherein when a respective pin is in engagement with a respective aperture, the pin extends transversely to and away from the second lateral side,
whereby the at least four pins are configurable to hold the block intermediate of the at least four pins and in operatively supported connection with the second lateral side,
wherein with the body operatively supported above ground level on the post and the block intermediate of the at least four pins, the block is accessible by an animal through the access openings.

2. The apparatus according to claim 1
wherein the second lateral side includes a substantially planar face,
wherein the substantially planar face extends across all four arms and the central hub.

3. Apparatus comprising:
an elevator support configured to hold a block of an animal consumable substance above ground level for consumption by animals, including
a body,
wherein the body includes
a central hub, and
four arms,
wherein each arm extends radially outward away from the central hub,
wherein each arm is angularly spaced from each immediately adjacent arm,
wherein an access opening extends between each pair of immediately adjacent arms,
wherein the body includes in an operative position a ground facing first lateral side and an opposed sky facing second lateral side,
wherein the central hub on the first lateral side includes a recess, wherein the recess is configured to receive a top of a vertically extending post,
wherein the second lateral side includes a substantially planar face,
wherein the substantially planar face extends across all four arms and the central hub
wherein on the second lateral side each arm includes a plurality of apertures,
wherein each aperture on a respective arm is radially disposed from at least two other apertures on the respective arm,
at least four pins, wherein each of the at least four pins includes
a cylindrical boss, wherein the cylindrical boss is radially larger than each of the apertures, a stub,
wherein the stub extends axially outward on the pin on a first axial side of the boss, wherein the stub is sized to be releasably positionable in any of the plurality of apertures on any of the arms and the boss is configured to abut the planar face when the stub is positioned within a respective aperture,
wherein when a respective stub of a respective pin is positioned within a respective aperture, the respective pin extends transversely to and away from the second lateral side,
whereby the at least four pins are configurable to hold the block intermediate of the at least four pins and in operatively supported connection with the second lateral side,
wherein with the body operatively supported above ground level on the post and the block intermediate of the at least four pins, the block is accessible by an animal through the access openings.

4. The apparatus according to claim 3
wherein each of the at least four pins includes
a mast, wherein the mast extends axially on an opposed side of the cylindrical boss from the stub, wherein the mast is axially longer than the stub.

5. The apparatus according to claim 4
wherein each aperture extends through the respective arm on which the aperture is positioned,
wherein each stub when positioned in a respective aperture and with the cylindrical boss in engagement with the second lateral side, extends through the aperture and outward from the first lateral side of the body.

6. The apparatus according to claim 5
wherein each arm terminates outwardly away from the central hub in a smooth contoured end tip.

7. The apparatus according to claim 6
wherein the arms are arranged in opposed pairs that extend in linear alignment with respect to the central hub,
wherein the apertures in each arm of the aligned pair of arms are in linear alignment.

8. The apparatus according to claim 7
wherein the arms are angularly spaced at 90° angles.

9. The apparatus according to claim 8
wherein the recess comprises a substantially T-shaped recess.

10. The apparatus according to claim 8
wherein a collar extends outward on the first lateral side of the body,
wherein the recess extends inwardly in the collar.

11. The apparatus according to claim 10
wherein the collar and the recess are configured to locally deform and to biasingly engage and hold the top of the post in the recess.

12. The apparatus according to claim 10
wherein at least one of a stub positioned in engagement with a respective aperture and the body in which the aperture extends is configured to deformably biasingly engage and hold the stub in the aperture.

13. The apparatus according to claim 10
wherein each aperture is bounded by an annular tapered aperture wall that extends between the first and second lateral sides and is smaller in diameter at the first lateral side than at the second side,
wherein each stub includes a cylindrical outer stub wall, and wherein when the stub is positioned in the aperture the stub is engaged with the tapered annular aperture wall.

14. The apparatus according to claim 10
wherein each aperture is bounded by an annular cylindrical wall that extends between the first lateral side and the second lateral side and is of constant diameter,
wherein the stub of each pin includes a cylindrical tapered outer wall that has an increased diameter with distance away from a leading end of the stub that extends through the aperture,
wherein when the stub is positioned in the aperture the tapered outer wall of the stub is engaged with the cylindrical annular wall of the aperture.

15. The apparatus according to claim 10
wherein each aperture is bounded by an annular cylindrical wall that extends between the first lateral side and the second lateral side and is of constant diameter,
wherein the stub of each pin includes an annular cylindrical stub wall, wherein the annular cylindrical stub wall includes at least one outward projection thereon,
wherein when the stub is positioned in the aperture the outward projection is engaged with the cylindrical annular wall of the aperture.

16. The apparatus according to claim 10
and further comprising:
a top piece, wherein the top piece is releasably engageable with a plurality of the pins,
wherein when the top piece is in engagement with the pins the top piece overlies at least some of the second side.

17. Apparatus comprising:
an elevator support configured to hold a block of an animal consumable substance above ground level for consumption by animals,
including
a body,
wherein the body includes a central portion and a plurality of arms that extend outward from the central portion, wherein access openings extend between each immediately adjacent pair of arms,
wherein the body includes a ground face side, wherein the ground face side of the central portion includes at least one of a recess or projection configured to engage a top of an upward extending post,
wherein each of the arms include a sky face side, wherein the sky face side faces in a direction opposed of the ground face side,
a plurality of pins, wherein at least one pin extends outward from and transverse to the sky face side of each arm,
wherein a location of each respective outward extending pin on each arm is selectively changeable,
wherein the respective location of each of the plurality of pins is configurable to hold the block intermediate of the pins and in operatively supported connection with the sky face side of each arm,
whereby with the body supported above ground level on the post and the block intermediate of the plurality of pins, the block is accessible by animals through the access openings.

18. Apparatus comprising:
an elevator support configured to hold a block of an animal consumable substance above ground level for consumption by animals,
including
a body,
wherein the body includes a central portion and a plurality of arms that extend outward from the central portion, wherein access openings extend between each immediately adjacent pair of arms, wherein the body includes a ground face side, wherein the ground face side of the central portion includes at least one of a recess or projection configured to engage a top of an upward extending post, wherein each of the arms includes
- a sky face side, wherein the sky face side faces in a direction opposed of the ground face side, and
- a plurality of spaced apertures, a plurality of pins, wherein each pin is selectively releasably positionable in each of the plurality of apertures on each of the arms, and wherein at least one pin extends outward from and transverse to the sky face side of each arm, wherein a location of each respective outward extending pin on each arm is selectively changeable, wherein the respective location of each of the plurality of pins is configurable to hold the block intermediate of the pins and in operatively supported connection with the sky face side of each arm, whereby with the body supported above ground level on the post and the block intermediate of the plurality of pins, the block is accessible by animals through the access openings.

19. The apparatus according to claim 18
wherein the central portion of the body includes a central hub, and wherein the plurality of arms each extend radially outward in angularly spaced relation from the central hub, wherein the sky face side of each of the arms and a sky face side of the central hub opposed of the ground face side, are substantially planar, wherein the plurality of apertures in each arm are radially spaced at different radial distances relative to a center of the central hub.

20. The apparatus according to claim 19
wherein each of the plurality of apertures extend through a respective arm from the sky face side to the ground face side, and wherein each pin extends through the body from the sky face side and through the ground face side of a respective arm when positioned in a respective aperture, and wherein each pin includes a stub and a boss, wherein the boss is enlarged relative to the stub, and wherein when the stub is extended in a respective aperture the boss engages the sky face side of the respective arm in which the pin is positioned to limit the extent that the stub extends within the aperture.

21. The apparatus according to claim 18
wherein the body includes four arms,
wherein the arms are disposed from one another at 900 angles.

22. The apparatus according to claim 18
and further comprising:
a top piece, wherein the top piece is releasably engageable with a plurality of the pins,
wherein when the top piece is in engagement with the pins the top piece overlies at least some of the sky face side.

* * * * *